United States Patent
Karve et al.

(10) Patent No.: US 11,816,034 B2
(45) Date of Patent: Nov. 14, 2023

(54) FAST CACHE TRACKING TO SUPPORT AGGRESSIVE PREFETCHING

(71) Applicant: International Business Machines Corporation, Armonk, NY (US)

(72) Inventors: Mohit Karve, Austin, TX (US); Naga P. Gorti, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/079,619

(22) Filed: Oct. 26, 2020

(65) Prior Publication Data
US 2022/0129385 A1    Apr. 28, 2022

(51) Int. Cl.
*G06F 12/0862*    (2016.01)

(52) U.S. Cl.
CPC .... *G06F 12/0862* (2013.01); *G06F 2212/602* (2013.01)

(58) Field of Classification Search
CPC ........................ G06F 12/0862; G06F 2212/602
See application file for complete search history.

(56) References Cited

U.S. PATENT DOCUMENTS

| | | | |
|---|---|---|---|
| 8,290,972 B1* | 10/2012 | Deshmukh | G06F 16/24556 707/758 |
| 8,301,650 B1* | 10/2012 | Oliver | G06F 16/24557 707/758 |
| 9,898,445 B2 | 2/2018 | Reshadi et al. | |
| 9,898,446 B2 | 2/2018 | Weber et al. | |
| 10,102,134 B2 | 10/2018 | Chishti et al. | |
| 10,642,618 B1* | 5/2020 | Hakewill | G06F 9/3804 |
| 2011/0218972 A1* | 9/2011 | Tofano | G06F 16/1752 707/692 |
| 2011/0276744 A1* | 11/2011 | Sengupta | G06F 12/0246 711/103 |
| 2013/0036277 A1* | 2/2013 | Szczepkowski | G06F 3/0641 711/E12.001 |
| 2013/0138894 A1* | 5/2013 | Loh | G06F 12/0893 711/144 |
| 2013/0150072 A1* | 6/2013 | Kapoor | H04W 4/025 455/456.1 |
| 2013/0227051 A1* | 8/2013 | Khakpour | H04L 29/08729 709/213 |
| 2017/0154099 A1* | 6/2017 | Chen | G06F 16/325 |
| 2017/0344483 A1* | 11/2017 | Shwartsman | G06F 12/0875 |
| 2020/0142830 A1* | 5/2020 | Natanzon | G06F 12/0862 |

(Continued)

OTHER PUBLICATIONS

"Method for hierarchical data prefetching on a memory hierarchy," IP.Com, An IP.com Prior Art Database Technical Disclosure, IP.com No. IPCOM000029127D, IP.com Electronic Publication Date: Jun. 16, 2004, 5 pages.

(Continued)

*Primary Examiner* — Prasith Thammavong
(74) *Attorney, Agent, or Firm* — Rachel M. Yadlosky

(57) ABSTRACT

A Bloom filter is used to track contents of a cache. A system checks the Bloom filter before deciding whether to prefetch an address (by hashing the address and checking a value of the Bloom filter at an index based on the hash). This allows the system to utilize more aggressive prefetching schemes by reducing the risk of wasteful redundant prefetch operations.

18 Claims, 4 Drawing Sheets

(56) References Cited

U.S. PATENT DOCUMENTS

2021/0303468 A1* 9/2021 Kallurkar ............ G06F 12/0811

OTHER PUBLICATIONS

"Optimizing Maximum Processor Power Usage by Dynamically Enabling and Disabling Performance-only Array Reads," IP.Com, An IP.com Prior Art Database Technical Disclosure, IP.com No. IPCOM000215534D, IP.com Electronic Publication Date: Mar. 6, 2012, 5 pages.

"A Methodology for Effective Insertion of Software Instruction Prefetchs for Return Branch Predictions," IP.Com, An IP.com Prior Art Database Technical Disclosure, IP.com No. IPCOM000223699D, IP.com Electronic Publication Date: Nov. 23, 2012, 6 pages.

Srinath et al., "Feedback Directed Prefetching: Improving the Performance and Bandwidth Effciency of Hardware Prefetchers," Microsoft and University of Texas at Austin, Printed Oct. 13, 2020, 12 pages.

Breternitz Jr. et al., "A Segmented Bloom Filter Algorithm for Efficient Predictors," Research Gate, Conference Paper, Oct. 2008, DOI: 10.1109/SBAC-PAD.2008.24, Source: DBLP, 9 pages.

Mehta et al., "Fetch Halting on Critical Load Misses," Research supported in part by NSF grant No. CCR-0311180 and an equipment grant from Sun Microsystems, Printed Oct. 13, 2020, 6 pages.

Pugsley et al., "Sandbox Prefetching: Safe Run-Time Evaluation of Aggressive Prefetchers," This work was supported in part by NSF grant CNS-1302663, Printed Oct. 13, 2020, 12 pages.

Çavus, "Software Support for Hardware Predictors," University of Rhode Island, DigitalCommons@URI, 2019, 155 pages.

Xun Li et al., "ReDHiP: Recalibrating Deep Hierarchy Prediction for Energy Efficiency," IEEE 28th International Parallel and Distributed Processing Symposium, 2014, 12 pages.

Guo et al., "The Dynamic Bloom Filters," IEEE Transactions on Knowledge and Data Engineering, vol. 22, No. 1, Jan. 2010, 14 pages.

* cited by examiner

FAST CACHE TRACKING TO SUPPORT AGGRESSIVE PREFETCHING

BACKGROUND

Almost all modern computing systems utilize caching in some form or another. Caches essentially serve as a temporary local copy of information. Accessing a cache is significantly more time- and power-efficient than reading data from longer term and/or larger storage (such as a hard drive and/or main memory).

Prefetching is an increasingly common way to attempt to reduce the number of time-consuming storage accesses required by an application. If a desired line (be it an instruction or segment of data) is not stored in a cache, it may need to be read from longer-term storage, which comes with a significant time loss. Prefetching takes advantage of a concept known as "temporal locality," which recognizes that data/instructions are frequently called in small groups. For example, if data at address 0003 is called, temporal locality suggests that data at addresses 0004, 0005, and 0006 are likely to be called in the near future. Thus, upon detecting a call for data at address 0003, many prefetching systems might preemptively read addresses 0004-0006 into the cache. This way, if addresses 0004-0006 are indeed called next, these calls will result in cache hits.

SUMMARY

Some embodiments of the present disclosure can be illustrated as a method. The method includes predicting a candidate address. The method further includes calculating a hash of the candidate address. The method also includes checking a Bloom filter based on the hash. The method also includes determining (based on the checking) to prefetch information stored at the candidate address.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a processing unit, such as a controller or central processing unit (CPU). The processing unit may be configured to execute instructions to perform the method discussed above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
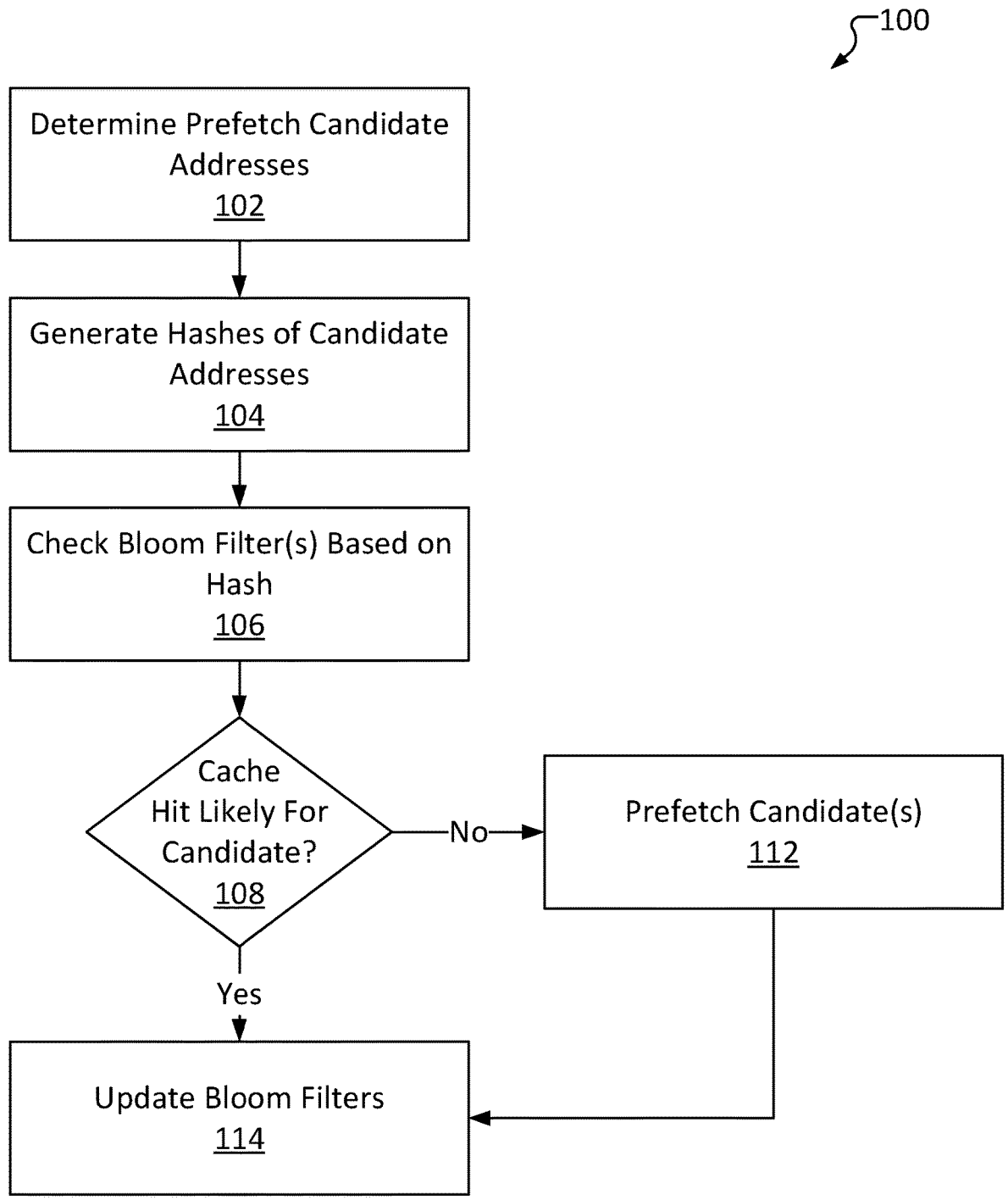
FIG. 1 illustrates a high-level cache monitoring method including checking Bloom filter contents before deciding whether to prefetch information consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to monitor cache contents. More particular aspects relate to a system to detect a cache hit, determine addresses of prefetch candidates, determine, based on a Bloom filter, whether to prefetch the prefetch candidates, and maintain the Bloom filter based on cache writes.

Throughout this disclosure, reference is made to "data," "instructions" and "information." Many systems implement separate data caches (Dcaches) and instruction caches (Icaches). Systems and methods consistent with the present disclosure can be implemented to improve performance of either (or both) as well as systems with no distinction between data and instructions. Therefore, to avoid confusion, the term "information" is used as a generalized form of both "data" and "instructions." Caches are described herein as storing information; this can refer to a Dcache storing data or an Icache storing instructions as well as other memory management techniques, such as paging and single level store.

Throughout this disclosure, reference is made to "prefetching," as well as deciding whether or not to prefetch. As used herein, prefetching refers to "preemptively" reading information from memory into a cache (reading information from memory into a cache before it is needed). When determining whether or not to prefetch information, that information is referred to herein as a "prefetch candidate" and the memory address at which the information is stored is referred to as a "candidate address."

Throughout this disclosure, reference is made to "addresses" and "indices." As used herein, "addresses" refers to an address in memory (which can refer to volatile memory, such as random access memory (RAM) or non-volatile memory, such as a hard disk drive (HDD)). Information is stored in memory at a particular address. This information may also be stored in the cache at a particular cache address. However, for purposes of this disclosure, an "address" refers to a specific location in memory. This disclosure makes reference to one or more arrays and/or vectors used to track a state of a cache. An "address" of information is hashed (or otherwise converted) to generate a corresponding "index" of a data structure, such as a vector. While the two are related, they are not interchangeable. The value of the vector stored at a given index is used to inform whether the information stored at the corresponding address is also currently stored in the cache.

Throughout this disclosure, reference is made to Bloom filters. As used herein, a Bloom filter refers to a probabilistic data structure (for example, a 1-dimensional array or vector). Bloom filters are updated to monitor/track contents of a cache. Typically, Bloom filters will have values of either "0" or "1" (which is referred to herein as a "binary" Bloom filter). This value may be updated upon a cache write occurring to reflect that certain information is cached. As an illustrative example, in some embodiments, whenever information stored at an address in memory is written to the cache, a value at an index of the Bloom filters is set to "1" to reflect this. The index depends on the memory address of the information that was cached. In an example embodiment, the address of the information written to the cache is hashed, and the hashed result is used as the index for the Bloom filter. Thus, a system may be able to check whether information at a given address is cached by hashing the address and checking whether the value of the Bloom filter (at an index of the Bloom filter corresponding to the hash of the address) is a "1" or a "0."

Notably, the hashing algorithm used on the address does not necessarily provide unique outputs; this enables usage of a Bloom filter with fewer indices than the size of the address space, at the cost of introducing the possibility of "false positives." For example, if address A and address B both hash to index X, then the value of the Bloom filter at index X will be updated when either A or B is cached. For example, caching information stored at address A will cause X to be set to "1." A later check to determine if address B is cached will check index X (which is "1" because of A), indicating that address B is cached regardless of whether it actually is or not. With proper fine tuning/adjustment of the hashing algorithm/size of the Bloom filter(s), significant performance improvements can be reached. A simple index calculation algorithm would simply use the requisite number of least significant bits of the cache line address (the address after dropping the cache line offset bits). For example, in order to access a 1024-entry Bloom filter, only the 10 least significant bits of the cache line address could be used. A more sophisticated hashing algorithm might apply an XOR function to additional bits of the cache line address to compress 20-30 bits of the address into a 10-bit index. This could provide more even usage of the Bloom filter. Similarly, the size of the Bloom filter itself may be tuned depending on the size of the cache and the footprint of the typical workload running on the processor. A size of 1024 entries has been found to provide adequate coverage in most cases.

When an address is called, the next several addresses are likely to be called (based on temporal locality), as would be understood by one of ordinary skill in the art. Thus, when an address is read, prefetching a set of following addresses can result in a series of cache hits. However, if the prefetched candidates were already in the cache, they would have been cache hits even without the prefetching, which would render the prefetching redundant and wasteful. The power cost of such "unused" prefetches can be particularly high because the cache directory must be queried to verify if a prefetch is required. Such queries consume a lot of power, especially for highly associative caches. As the concept of temporal locality can also apply to contents of a cache, prefetching after a cache hit may be particularly likely to result in wasted work.

As a clarifying example, information may be the instruction "Add 3 to X." This information may be stored in memory at address 5350. When address 5350 is called, instruction "Add 3 to X" is written to the cache. When this occurs, the address (5350) is hashed. For purposes of a simple example, the hashing algorithm may simply take the last two digits of the address, so the hashed result here is 50 (the last two digits of 5350 being 50). The hashed result of the address is used as an index of a Bloom filter. The value of the filter at this index is set to "1." Thus, in this example, when the instruction "Add 3 to X" is written to the cache, the 50th entry in a vector is set to "1" (these values are in base 10 for simplicity). Later, the Bloom filter may be checked to determine whether the information stored at address 5350 (i.e., "Add 3 to X") is cached. In order to perform this check, the address is hashed again (again resulting in 50), with the result of the hash being used as an index (thus, the 50th value of the Bloom filter is checked). Since the value is "1," this indicates that the information stored at the address in question (5350) is in the cache.

If the candidates are not cached, prefetching them can result in cache hits instead of cache misses, saving significant time. However, if the candidates are already cached, prefetching them is redundant, thus wasting the power, time and resources required to prefetch. Therefore, "aggressive" prefetching schemes (such as, for example, automatically prefetching the 5 subsequent addresses following a called address) can end up costing more resources than they save. Thus, systems and methods consistent with the present disclosure provide for a computationally lightweight way to determine if the candidates are already in the cache or not, informing the decision of whether or not to prefetch them. If the candidates are already cached, refraining from prefetching them can save duplicate work and power.

However, maintaining one or more Bloom filters to keep track of contents of the cache can advantageously enable an "aggressive" prefetching scheme which might otherwise frequently waste power. Some systems implement multiple caches; an instruction cache (Icache) and a data cache (Dcache). Instructions are typically read in relatively smaller localized groups when compared to data from data caches (Dcaches). For example, when reading data, it may be typical to read thousands of addresses in sequence, whereas instructions are usually read in groups of around three to ten. Thus, typical aggressive prefetching is significantly more likely to be wasteful in the context of Icaches vs. Dcaches.

For example, while prefetching several thousand data addresses is likely to result in at least some wasted work (e.g., information stored at some of the addresses prefetched is likely to have already been cached), the time and power saved by the other prefetches (turning what would have been cache misses into cache hits) generally remains a significant performance boost. However, with the smaller groups dealt with in Icaches, it only takes a few wasted prefetches for the cost of the prefetching to outweigh the savings. As a simple example, 50 wasted prefetches out of 3,000 (a typical data read) is a trivial amount of wasted resources when compared to the benefit of turning 2,950 would-be cache misses into cache hits. On the other hand, 2 wasted prefetches out of 3 (a typical instruction read) might cost more than the resulting single cache hit saves. In view of this risk, many systems neglect to aggressively prefetch in the context of Icaches, as the possible gains are outweighed by the commensurate risks. Thus, systems and methods consistent with the present disclosure are particularly advantageous when applied to instruction caches (Icaches), although they will still result in performance improvements when applied to Dcaches as well.

As values of a Bloom filter are set to "1" as the cache is written to, over time the Bloom filter can become saturated to the point where, if left unchecked, all values will eventually become "1." To address this, in some embodiments, Bloom filters are periodically flushed, setting all of their values to "0." In some embodiments, whenever information is evicted from the cache, the corresponding index of the Bloom filters may be set to "0," although this can result in false negatives for other addresses which, when hashed, correspond to the same index.

Bloom filters, in some embodiments, may be described herein as having "life cycles," and are referred to as being "old" or "young" relative to these life cycles. After a Bloom filter is flushed, subsequent lookups of the newly-flushed filter are likely to return negative, regardless of the state of the cache. Over time, values in the filter will be changed from "0" to "1" as information is written to the cache, so as the cache is written to, a newly-flushed filter will "mature." In order to alleviate the likely false negatives returned from the "youngest" (most-recently-flushed) filter, many embodiments of the present disclosure utilize at least two distinct filters. For example, in some embodiments, a filter's lifetime may be set at 10,000 cycles, meaning that every 10,000 cycles, the filter is flushed. However, using two filters, the flushes may be offset by 5,000 cycles.

As an illustrative example (but temporarily disregarding the possibility of "false positives" explained above for the sake of example), if a data address was cached 7,000 cycles ago (i.e., before the younger filter had been flushed), it would only appear in the older filter. In other words, the older filter would have a value of "1" at the index corresponding to the hash of the address, but the younger filter would have a "0" at the same index. However, if a data address was cached 12,000 cycles ago (i.e., before both filters had been flushed), it would not appear in either filter. If, on the other hand, a data address was cached after the youngest filter was flushed, then both filters would indicate that the data address was cached.

When checking the filters to determine whether an address is already cached, a system may take the logical OR of the two (or more) filters. This alleviates the false negatives of the youngest filter. Whenever the cache is written to, the corresponding index of all Bloom filters may be set to "1." Therefore, checking the logical OR of the filters is effectively the same as checking the oldest filter (but taking the OR may be faster and more efficient than tracking and determining which of the filters has gone the longest without being flushed).

In some embodiments, rather than specifically setting a value to "1" as in the "binary" Bloom filters discussed above, the value may be incremented. This way, a Bloom filter may represent a number of times the addresses (of information written to cache) hashed to a particular output. In some embodiments, multiple such Bloom filters may be implemented, where checking the filters includes taking a maximum value for each index (for example, if two filters are [0,0,1,0] and [1,0,3,0], a system checking the filters may check a value from [1,0,3,0]). As with the logical OR described above with reference to "binary" filters (filters whose values are restricted to either "1" or "0"), this is functionally identical to checking the "oldest" filter. While this disclosure focuses on the simpler "binary" filter embodiments, this is not intended to be restrictive. As would be understood by one of ordinary skill in the art, Bloom filters with more than two possible values can be implemented with minimal modifications.

In some embodiments, decisions of whether or not to prefetch can be further informed by knowledge of specific properties (or "behavior") of a hashing algorithm being used. For example, different hash algorithms may have varying sizes of "output spaces" (ranges of possible output values given a range of possible inputs). This can be utilized in combination with tracking how many times instructions whose addresses hash to a specific output have been cached (for example, in order to more accurately determine a likelihood that a given instruction is already cached). As a simple example, a hash algorithm may simply divide an input address by two, rounding down, and a Bloom filter may suggest that two previous cache writes were storing information whose memory address hashed to a given index. If a candidate address hashes to the given index, then the knowledge that there are only two possible memory addresses out of the entire address space that can hash to that particular index (index*2 and index*2+1), combined with the Bloom filter's indication that two previous cache writes pertained to memory addresses that hashed to that index, may strongly suggest that the information in question is cached. However, it is still possible that these two cache writes were a result of information at a single address being written to the cache twice, as opposed to information at two addresses who both hash to the same index being written to the cache once. Either occurrence might result in the filter having a value of "2," so false positives are still possible.

As an illustrative example, an output of a first "hash" algorithm might be the final ("ones") digit of an input number (so an input of "64" would yield an output of "4," an input of "1024" would also yield an identical output of "4," and an input of "4096" would yield an output of "6," etc.). An output of a second hash algorithm might be an input divided by 16, rounded down (so an input of "64" would yield an output of "4," an input of "1024" would yield an output of "64," an input of "4097" would yield an output of "256," etc.). Notably, the first algorithm only has 10 possible outputs, 0-9, so in a system with more than 10 possible distinct inputs, duplicate outputs are inevitable. While the second algorithm's rounding down can also result in duplicates, a system with more than 159 possible inputs will have more possible outputs, and therefore a larger "output space" than that of the first algorithm.

FIG. 1 illustrates a high-level cache monitoring method 100 including checking Bloom filter contents before deciding whether to prefetch information consistent with several embodiments of the present disclosure. Method 100 may be performed by a computer system implementing one or more memory caches (such as, for example, system 400 of FIG. 4).

Method 100 includes determining a set of addresses at operation 102. In some embodiments, operation 102 may be performed in response to detecting a cache hit. In some embodiments, operation 102 may be performed periodically in response to a read request (for example, after every 5 read requests, after every read request, etc.). Operation 102 may include determining an address of a first read request. Operation 102 further includes determining one or more subsequent addresses based on the address of the first read request. The one or more subsequent addresses are utilized as the set of "prefetch candidates." In some embodiments, the set of prefetch candidates may only include a single address (such as the address immediately following the address of the first read request). Other numbers of prefetch candidates are also possible (for example, the following 3 addresses, the following 5 addresses, etc.). In embodiments where method 100 is performed in the context of a data cache, the set may contain significantly more addresses (for example, the following 5,000 addresses).

Method 100 further includes generating hashes of the prefetch candidate addresses at operation 104. Various methods of hashing may be utilized; for example, in some embodiments, operation 104 may include performing one or more mathematical operations on the address (such as dividing by a power of 2), cropping a preset number of bytes of the address, etc. In some embodiments, operation 104 may include implementing one or more known hashing algorithms on the address.

In some embodiments, operation 104 may be performed for each candidate address. In some embodiments, operation 104 may be performed for only a first of the set of candidate addresses; in such embodiments, a prefetching decision may be made based on the first candidate and then applied to the rest.

Method 100 further includes using the hash(es) to index into the Bloom filters at operation 106. Operation 106 may include, for example, utilizing a hash of a candidate address as an index of a vector. In some embodiments, multiple Bloom filters may be utilized in order to reduce a chance of a false negative result (as will be explained in further detail below). In some of these "multi-filter" embodiments, operation 106 may include selecting a single filter and checking the value at the hash-derived index. For example, operation 106 may check the "oldest" Bloom filter (the "oldest" being the Bloom filter which has gone the longest since being flushed). In order to reduce overhead of tracking "age" of the various filters, in some embodiments, by "checking," operation 106 may instead take the logical OR of all filters and check the index of the resulting vector. Notable, the "age" of the filters may still be monitored (in order to determine whether a filter should be flushed), but the same hardware structure may not be used for both functions. For example, a first structure may only track the passage of time and reset the oldest filter, while a second structure may read all the filters and OR them.

As an illustrative example, if a system is utilizing two Bloom filters and the hash of a candidate address generated at operation 104 is a hexadecimal 10FB, operation 106 may include generating a vector V by taking the OR of the two Bloom filters and checking whether V(4347) is a "1" or a "0" (noting that hexadecimal 10FB is equivalent to decimal 4347).

Method 100 further includes determining whether the candidate address is likely to be a cache hit at operation 108 by analyzing the result of operation 106. For example, in some embodiments, if the value at the index checked at operation 106 is a "1," then the corresponding candidate address is considered likely to be cached (108 "Yes"). Notably, the use of Bloom filters introduces the possibility of false positives; thus, even if the determination made at operation 108 suggests that the candidate address's information is likely to be in the cache (meaning a lookup of the candidate address likely to be a cache hit), a cache miss is still possible. However, the resources that can be saved via method 100 may enable a more aggressive prefetching scheme, which typically outweighs this risk in the aggregate.

The prefetch candidate addresses determined at operation 102 are not guaranteed to be accurate predictions; regardless of a state of the cache, the address evaluated at operations 104-108 may end up not being called anyway. However, this possibility is inherent to the concept of prefetching in general, and well-established as an acceptable risk.

If a cache hit is not expected for the candidate address (108 "No"), method 100 proceeds to operation 112. Operation 112 includes prefetching the information stored at the candidate address. For example, operation 112 may include accessing memory and writing the information stored at the candidate address to the cache. Operation 112 may also include causing a line of the cache to be evicted, in keeping with typical cache operation.

Method 100 further includes updating the Bloom filter(s) at operation 114. Regardless of whether the candidate is likely to be a cache hit, or even whether the candidate is actually called, the Bloom filters are updated to reflect what is actually written to the cache. Operation 114 may include, for example, setting values of the filters to "1" based on information written to the cache. For example, in some embodiments, regardless of the next address called, that next address is hashed (in a manner similar to operation 104), and the hashed address is used as an index of the Bloom filters. The value of the Bloom filters at this index may be set to "1," regardless of its previous state. Notably, even if the next address called is not one of the candidate addresses, the Bloom filters are updated to reflect that the information stored at the next address is written to the cache. In some embodiments, operation 114 includes waiting for information to actually be written to the cache before setting values at the corresponding index to "1."

If a cache hit is expected for the candidate address (108 "Yes"), method 100 proceeds from operation 108 to operation 114. Notably, operation 114 does not include prefetching the candidate address, as this is expected to be a waste of resources because the information stored at the candidate address is expected to already be in the cache (though this may be incorrect as a result of a false positive). Instead, method 100 proceeds to updating the Bloom filters at operation 114. The process of maintaining and/or updating the Bloom filters is described in further detail below, with reference to FIG. 2.

Figure 2:
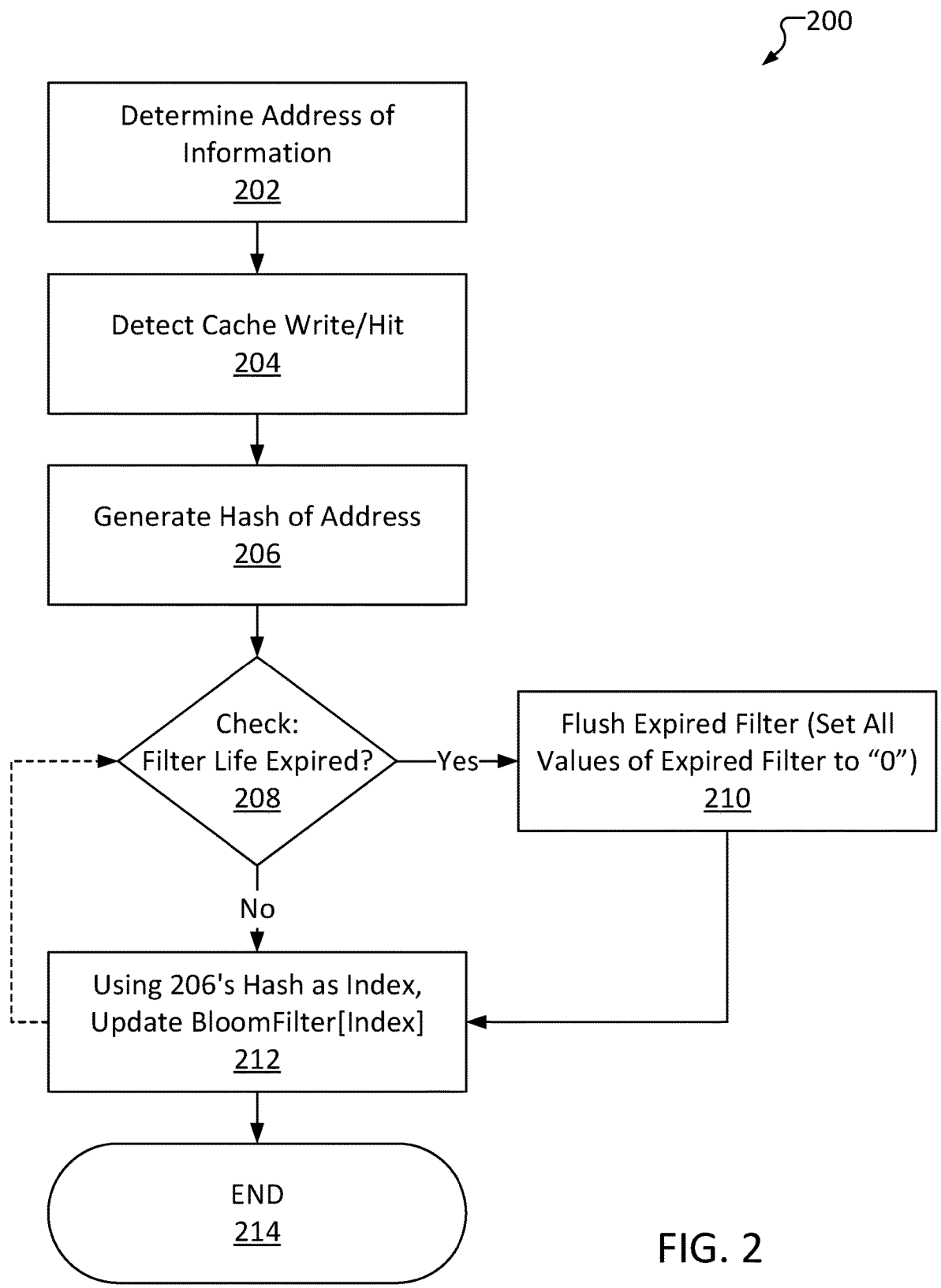
FIG. 2 illustrates a high-level flow diagram of a Bloom filter update method, consistent with several embodiments of the present disclosure.

FIG. 2 illustrates a high-level flow diagram of a Bloom filter update method 200, consistent with several embodiments of the present disclosure. Method 200 may be performed by a computer system implementing one or more memory caches (such as, for example, system 400 of FIG. 4). Method 200 may enable a system to maintain and/or update one or more Bloom filters to track cache contents (in turn advantageously enabling a more aggressive prefetch policy).

Method 200 includes determining an address (in memory) of information associated with a request at operation 202. Depending upon embodiment, the address determined at operation 202 may correspond to information that was recently written, is being written, or is about to be written to the cache from memory (for example, the address may be the memory address of an instruction that was recently called by an application). In some embodiments, the address may correspond to information already in the cache. For example, if an application calls an instruction and a subsequent cache lookup results in a cache hit, operation 202 may include determining the address of the instruction, even if it was not recently read from the memory.

Method 200 further includes detecting a cache write and/or hit at operation 204. Operation 204 may include, for example, detecting that the request associated with the address determined at operation 202 is a call or read operation that will result in a cache write. In some embodiments, the cache write detected at operation 204 may not have occurred yet (for example, operation 204 may include detecting an operation immediately preceding a cache write, etc.). In some embodiments, operation 204 may include detecting a cache hit.

Method 200 further includes generating a hash of the address at operation 206. Various methods of hashing may be utilized; for example, in some embodiments, operation 206 may include performing one or more mathematical operations on the address (such as dividing by a factor), cropping a preset number of bytes of the address, etc. In some embodiments, operation 206 may include implementing one or more known hashing algorithms on the address.

Method 200 further includes determining whether a lifetime of the Bloom filter has expired at operation 208. Operation 208 may include, for example, reading, calculating or otherwise determining a number of cycles that have elapsed since the filter was last flushed, and comparing that number to a preset maximum. If the number exceeds the maximum, the Bloom filter's life has expired (208 "Yes"), and method 200 proceeds to flushing the filter at operation 210. Operation 210 may include, for example, setting every value of the expired filter to "0." Other metrics besides "cycle count" may be used to track a filter's "age" and are also considered herein, such as, for example, elapsed time, number of writes (e.g., number of writes to one or more of the filter, cache, memory, etc.), etc. Flushing (e.g., operations 208 and 210) may be performed outside of method 200 (in other words, flushing is not dependent on performing operation 204).

After an expired filter is flushed at operation 208, or if the Bloom filter's life has not yet expired (208 "No"), method 200 proceeds to updating a value of the Bloom filter at operation 212. Operation 212 may include, for example, setting a value at a specific index of the Bloom filter to "1." The specific index whose value is modified is determined based on the hashed address generated at operation 206. For example, if the address determined at operation 202 is "4050" and the output of the hashing of operation 206 is "50," then operation 212 may include setting the 50th value of the Bloom filter to "1."

In some embodiments, rather than strictly setting the value to "1," operation 212 may increment the value by 1. For example, if the hash of the address is again "50" but the 50th value of the Bloom filter is already "1," operation 212 may set the 50th value of the Bloom filter to "2." This may effectively enable the Bloom filter to track the number of times that information at an address corresponding to a particular index has been written to the cache. Notably, this is not necessarily a number of times information at a specific address has been written to the cache, as some address inputs to the hashing algorithm(s) may result in identical outputs (the same issue giving rise to the possibility of false positives). For example, if three addresses "share" an index (meaning all three addresses hash to the same result), a filter value of 4 might mean that one address has been written to the cache three times, a second address has been written to the cache once, and a third address has not been written to the cache (since the last flush). In "incrementing" embodiments, rather than taking an OR of the filters, a MAX may be taken instead.

Method 200 can be performed for all filters. In embodiments including multiple filters, aspects of method 200 (such as operation 212) may be performed on each filter, either serially or in parallel. Method 200 ends at 212.

Figure 3:
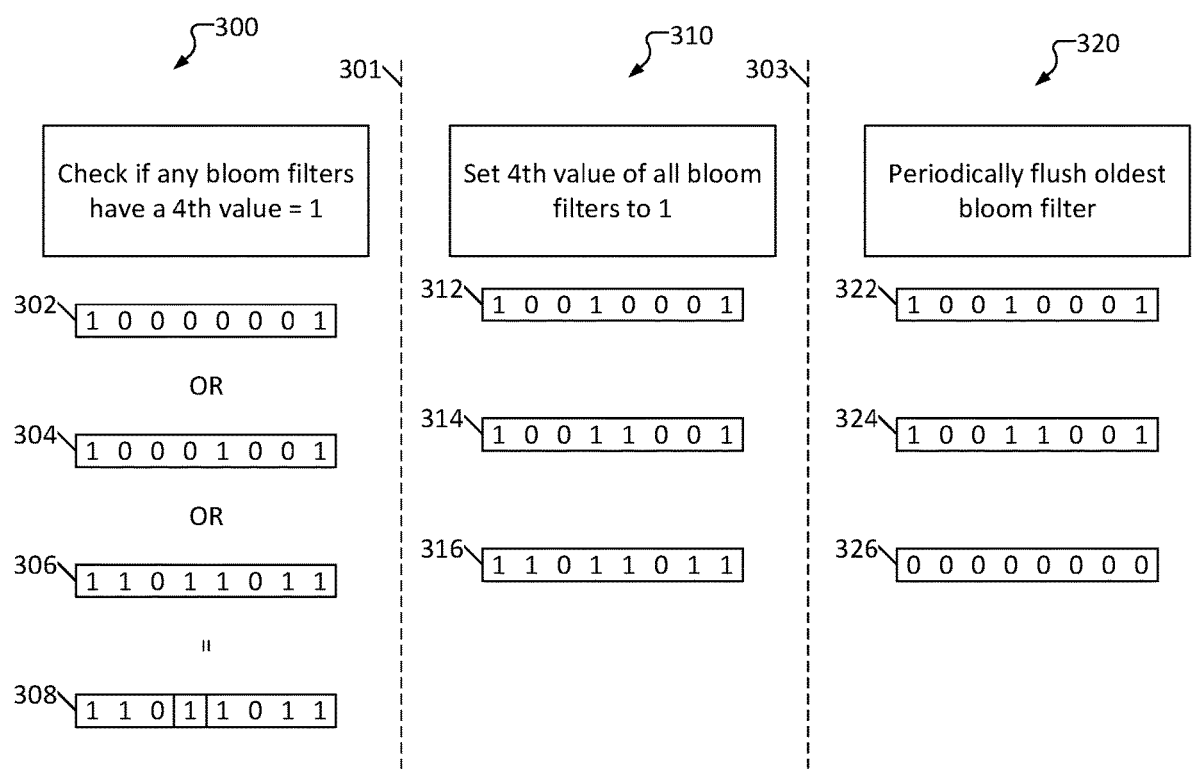
FIG. 3 illustrates example Bloom filter implementations consistent with several embodiments of the present disclosure.

FIG. 3 illustrates example Bloom filter implementations 300, 310 and 320 consistent with several embodiments of the present disclosure. FIG. 3 includes examples of checking a series of Bloom filters at a given index (300), setting a given index of Bloom filters (310), and flushing a Bloom filter (320). In the interest of simplicity for explanation, these examples include Bloom filters with 8 values, wherein the value being checked and/or updated is the 4th (for example, an address may have been hashed to produce an index of 4). These examples are separated by dashed lines 301 and 303.

Checking Bloom filters (300) may include taking a logical OR of each Bloom filter. In FIG. 3, 3 Bloom filters (302, 304 and 306) are depicted being checked. A result vector 308 is generated by taking a logical OR of filters 302, 304 and 306. If the 4th value (starting from the left) of the result vector 308 is a "1," this may indicate that the information whose address hashed to index "4" is in the cache. As this result vector is effectively the same as the "oldest" Bloom filter, the result vector itself may be considered another Bloom filter.

In some embodiments, this result vector may be generated every cycle. This may advantageously reduce the time required to check whether an address is likely to result in a cache hit or not, because the result vector is generated ahead of time. However, this may result in additional power consumption, as only a single value of the result vector is likely to be checked before the entire vector is replaced. Thus, in some embodiments, the result vector is not generated until the index in question is known, at which point the value of each Bloom filter at that index is checked (with the checking ending immediately upon locating a "1" is located). This may result in power savings, but is likely to be slower than the result vector approach, because it requires checking multiple values and only begins after the index is determined.

If information whose address hashes to index "4" is written to the cache, then the Bloom filters are all updated by setting their 4th value to "1" as depicted at 310. In FIG. 3, filters 312, 314 and 316 represent updated versions of filters 302, 304 and 306, respectively. Notably, while filters 302 and 304 had a 4th value of "0," filters 312 and 314 have their 4th values set to "1." While filter 306 already had a 4th value of "0," in some embodiments, filter 316 may still undergo a write operation (overwriting the "1" with another "1"). While this may be redundant, it may also reduce complexity of the system. In some embodiments, values are checked and only overwritten if the end result would be different (in other words, a check may determine whether filter 306's 4th value is "1," and if it is, it may be left as-is to conserve resources). In some embodiments, rather than setting a particular value to "1," a value may be incremented instead. For example, filter 316's 4th value may be set to "2" (incrementing upon filter 306's "1").

Filters may also be flushed periodically, an example of which is depicted in column 320. Flushing a filter may include setting all values of the filter to "0." As depicted in FIG. 3, filter 326 (which corresponds to filters 306 and 316) is flushed. As described above, filters may be flushed based on time, a cycle count, a write count, etc. For example, a filter may be flushed every 10,000 cycles. In embodiments with multiple filters (such as the examples depicted in FIG. 3), the filters may be flushed at the same frequency, but offset from each other. For example, filters 322, 324 and 326 may be flushed every 10,000 cycles, but filter 326 may be flushed at cycle X, filter 322 may be flushed at cycle (X+3,333), filter 324 may be flushed at cycle (X+6,667), and then filter 326 may be flushed again at cycle (X+10,000). In conjunction with updating the filters simultaneously (as shown in column 310) and taking a logical OR of all filters when checking them (as shown in column 300), this allows result vector 308 to essentially reflect the cache contents based on the last 10,000 cycles (but without being influenced by any operations that occurred more than 10,000 cycles ago). This way, result vector 308 can be used for a relatively quick means to check contents of the cache without significant overhead. The frequency of the flushes and the number of filters can be adjusted based on system configuration. For example, if a system's cache is particularly small such that contents of the cache are typically evicted within 5,000 cycles of being written, filters may be flushed more frequently (e.g., every 5,000 cycles, rather than every 10,000 cycles) to reduce the chance of a Bloom filter check producing a "false positive."

Figure 4:
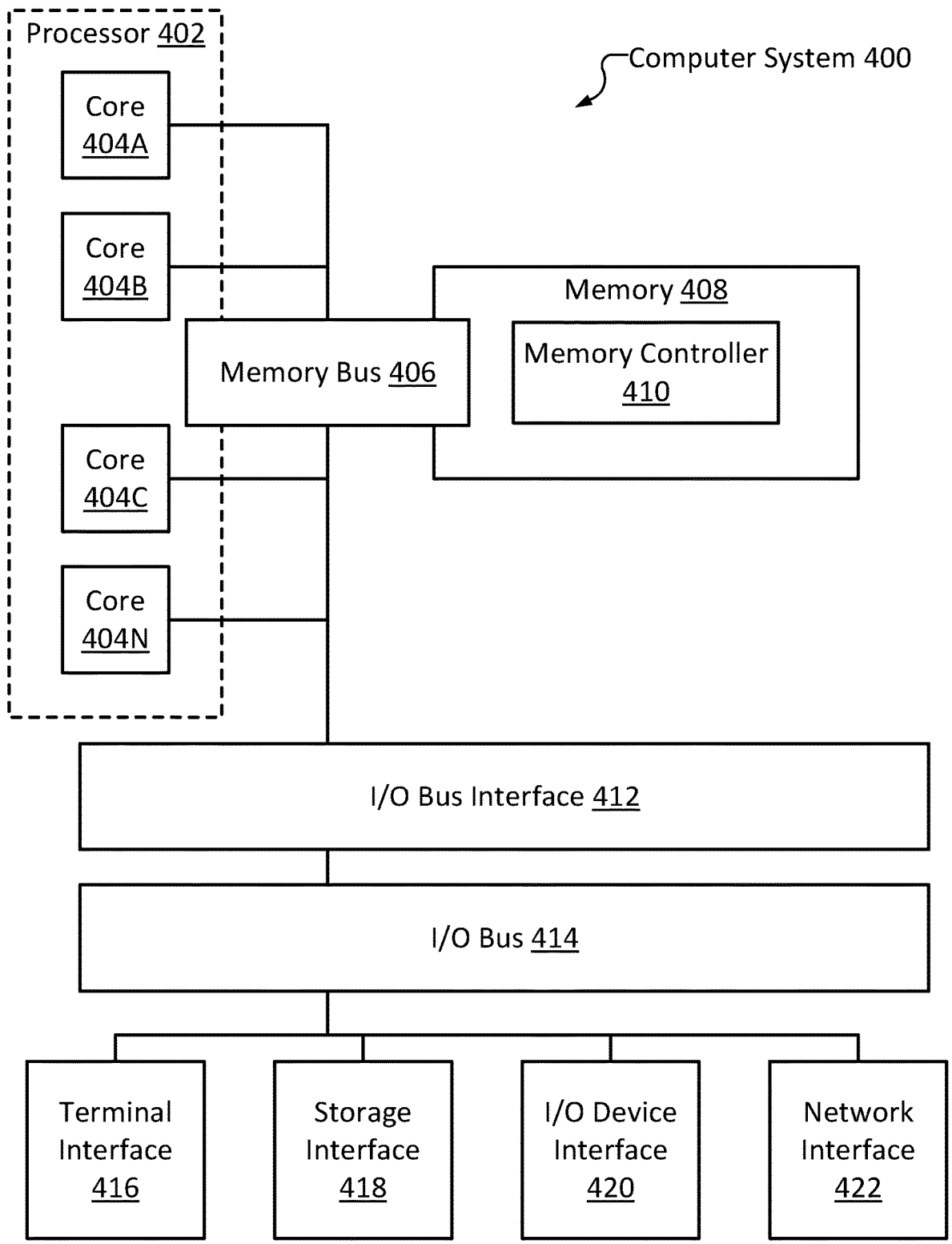
FIG. 4 illustrates a high-level block diagram of an example computer system that may be used in implementing embodiments of the present disclosure.

Referring now to FIG. 4, shown is a high-level block diagram of an example computer system 400 that may be configured to perform various aspects of the present disclosure, including, for example, methods 200 and 300, respectively. The example computer system 400 may be used in implementing one or more of the methods or modules, and any related functions or operations, described herein (e.g., using one or more processor circuits or computer processors of the computer), in accordance with embodiments of the present disclosure. In some embodiments, the major components of the computer system 400 may comprise one or more CPUs 402, a memory subsystem 408, a terminal interface 416, a storage interface 418, an I/O (Input/Output) device interface 420, and a network interface 422, all of which may be communicatively coupled, directly or indirectly, for inter-component communication via a memory bus 406, an I/O bus 414, and an I/O bus interface unit 412.

The computer system 400 may contain one or more general-purpose programmable central processing units (CPUs) 402, some or all of which may include one or more cores 404A, 404B, 404C, and 404D, herein generically referred to as the CPU 402. In some embodiments, the computer system 400 may contain multiple processors typical of a relatively large system; however, in other embodiments the computer system 400 may alternatively be a single CPU system. Each CPU 402 may execute instructions stored in the memory subsystem 408 on a CPU core 404 and may comprise one or more levels of on-board cache.

In some embodiments, the memory subsystem 408 may comprise a random-access semiconductor memory, storage device, or storage medium (either volatile or nonvolatile) for storing data and programs. In some embodiments, the memory subsystem 408 may represent the entire virtual memory of the computer system 400 and may also include the virtual memory of other computer systems coupled to the computer system 400 or connected via a network. The memory subsystem 408 may be conceptually a single monolithic entity, but, in some embodiments, the memory subsystem 408 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 402. This may include a memory controller 410.

Although the memory bus 406 is shown in FIG. 4 as a single bus structure providing a direct communication path among the CPU 402, the memory subsystem 408, and the I/O bus interface 412, the memory bus 406 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 412 and the I/O bus 414 are shown as single respective units, the computer system 400 may, in some embodiments, contain multiple I/O bus interface units 412, multiple I/O buses 414, or both. Further, while multiple I/O interface units are shown, which separate the I/O bus 414 from various communications paths running to the various I/O devices, in other embodiments some or all of the I/O devices may be connected directly to one or more system I/O buses.

In some embodiments, the computer system 400 may be a multi-user mainframe computer system, a single-user system, or a server computer or similar device that has little or no direct user interface but receives requests from other computer systems (clients). Further, in some embodiments, the computer system 400 may be implemented as a desktop computer, portable computer, laptop or notebook computer, tablet computer, pocket computer, telephone, smart phone, mobile device, or any other appropriate type of electronic device.

It is noted that FIG. 4 is intended to depict the representative major components of an exemplary computer system 400. In some embodiments, however, individual components may have greater or lesser complexity than as represented in FIG. 4, components other than or in addition to those shown in FIG. 4 may be present, and the number, type, and configuration of such components may vary.

Throughout the disclosure, reference is made to setting various values of a Bloom filter to "1" (interpreted to imply that information is likely present in the cache) and occasionally flushing the filter, setting all of its values to "0" (interpreted to imply that information is not likely present in the cache). As would be understood by one of skill in the art, the specific values used ("1" and "0") are used for exemplary purposes only and are not meant to be restrictive. Other possible conventions are fully considered herein; for example, in some embodiments, a "0" may be interpreted to imply that information is likely present in the cache while the filters may be occasionally "flushed" by setting all values to "1." To clarify further, in some embodiments a "5" may imply that information is likely present in the cache while a "36" may imply that information is not likely present in the cache; the values themselves may simply be utilized as indicators.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
predicting a candidate address;
calculating a hash of the candidate address;
comparing a first Bloom filter and a second Bloom filter based on the hash;
generating a result vector based on the comparison;
checking the result vector;
determining, based on the checking, to prefetch information stored at the candidate address; and
prefetching, based on the determining, the information stored at the candidate address.

2. The method of claim 1, wherein the predicting includes:
predicting a second candidate address;
calculating a second hash of the second candidate address;

checking the first Bloom filter based on the second hash; and determining, based on the checking, that prefetching second information stored at the second candidate address is unnecessary.

3. The method of claim 1, wherein the predicting includes:
determining a first address of a cache hit; and
determining the candidate address based on the first address.

4. The method of claim 1, further comprising:
detecting a cache write; and
updating, based on the hash, a first value of the first Bloom filter and a second value of the second Bloom filter.

5. The method of claim 4, wherein the updating includes incrementing the first value and the second value.

6. The method of claim 5, further comprising periodically flushing the first Bloom filter and the second Bloom filter, wherein the flushing of the first Bloom filter is offset from the flushing of the second Bloom filter.

7. A system, comprising:
a memory; and
a processing unit coupled to the memory, wherein the processing unit is configured to execute instructions to:
determine an address of information written to the cache;
calculate a hash of the address;
determine an index based on the hash;
update a first value of a first Bloom filter at the index;
update a second value of a second Bloom filter at the index;
compare the first Bloom filter and the second Bloom filter; and
generate a result vector based on the comparison;
check the result vector;
determine, based on the checking, to prefetch information stored at the candidate address; and
prefetch, based on the determining, the information stored at the candidate address.

8. The system of claim 7, wherein the processing unit is further configured to:
detect a cache hit;
predict a candidate address associated with the cache hit; and
decide whether to prefetch information stored at the candidate address based on the result vector.

9. The system of claim 8, wherein the predicting includes:
determining a first address of a cache hit; and
determining the candidate address based on the first address.

10. The system of claim 8, wherein the deciding includes:
calculating a candidate hash of the candidate address;
determining a candidate index based on the candidate hash; and
checking a candidate value of the result vector at the candidate index.

11. The system of claim 7, wherein the processing unit is further configured to periodically flush the first Bloom filter and the second Bloom filter, wherein the flushing of the first Bloom filter is offset from the flushing of the second Bloom filter.

12. The system of claim 7, wherein the updating includes incrementing the first value.

13. The system of claim 7, further comprising:
updating the first bloom filter and the second bloom filter based on the result vector.

14. A computer program product, the computer program product comprising a computer readable storage medium having program instructions embodied therewith, the program instructions executable by a computer to cause the computer to:
determine an address of information written to the cache;
calculate a hash of the address;
determine an index based on the hash;
update a first value of a first Bloom filter at the index;
update a second value of a second Bloom filter at the index;
compare the first Bloom filter and the second Bloom filter; and
generate a result vector based on the comparison;
determine, based on the result vector, whether information stored at a candidate address is likely to be in the cache; and
prefetch the information stored at the candidate address if the information stored at the candidate address is not likely to be in the cache, and decide to not prefetch the information stored at the candidate address if the information stored at the candidate address is likely to be in the cache.

15. The computer program product of claim 14, wherein the instructions further cause the computer to:
detect a cache hit; and
predict the candidate address associated with the cache hit.

16. The computer program product of claim 14, wherein the determining whether the candidate address is likely to be in the cache includes:
calculating a candidate hash of the candidate address;
determining a candidate index based on the candidate hash; and
checking a candidate value of the result vector at the candidate index.

17. The computer program product of claim 14, wherein the instructions further cause the computer to periodically flush the first Bloom filter and the second Bloom filter, wherein the flushing of the first Bloom filter is offset from the flushing of the second Bloom filter.

18. The computer program product of claim 14, wherein the updating includes incrementing the first value.

* * * * *